United States Patent Office 3,147,118
Patented Sept. 1, 1964

3,147,118
FOG REDUCTION IN PHOTOGRAPHIC SILVER
HALIDE EMULSIONS
Fritz Dersch and Millet R. De Angelus, Binghamton,
N.Y., assignors to General Aniline & Film Corporation,
New York, N.Y., a corporation of Delaware
No Drawing. Filed Mar. 14, 1961, Ser. No. 95,499
20 Claims. (Cl. 96—109)

This invention relates to photographic materials and to methods of preparing them. More particularly, this invention relates to light-sensitive silver halide emulsions containing a stabilizing and antifogging agent.

It is well known in the photographic art that light-sensitive emulsions, such as gelatin-silver halide emulsions, have a tendency to fog. Fog is usually caused by a prolonged ripening of the emulsion, by prolonged storage especially at elevated temperatures and humidity, and by prolonged development. To overcome this undesirable property, it has been the practice in this art to add certain chemical compounds to the emulsions to increase their stability and to reduce their tendency to fog. However, many of the stabilizing and antifogging compounds heretofore used in this art have the disadvantage that upon addition to the emulsion they cause a loss of speed and/or contrast of the emulsion. This loss of speed is particularly pronounced in those regions of the spectrum to which the emulsion is optically sensitized.

It is, accordingly, an object of this invention to produce a light-sensitive emulsion which is fast, stable, has a reduced tendency to fog and has good contrast.

A further object of this invention resides in a light-sensitive emulsion which contains a compound which stabilizes the emulsion against fogging and at the same time does not materially reduce the speed and/or the contrast of the emulsion.

We have discovered that 1,2,3-trisubstituted imidazolium salts when added to a light-sensitive silver halide emulsion, stabilize and inhibit the fogging of the emulsion without reducing the contrast of the emulsion or lowering its speed in the region of optical sensitization.

The substituted imidazolium salts, the use of which is contemplated herein, may be represented by the following formula:

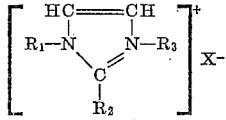

wherein $R_1$ is a lower alkyl radical, e.g., methyl, ethyl, propyl, isopropyl, butyl, amyl, isoamyl and the like, a thenyl, an allyl or methallyl radical; $R_2$ is an akyl radical, e.g., methyl, ethyl, propyl, isopropyl, butyl, isobutyl, amyl, hexyl, heptyl, octyl, nonyl, decyl, undecyl, dodecyl, tetradecyl, octadecyl and the like; $R_3$ is an alkyl radical of the same value as $R_2$ or a benzyl radical; and X represents a halide ion, e.g., chloride, bromide or iodide. In all instances, at least one of the substituents identified by $R_2$ and $R_3$ is of larger molecular size and contains a minimum of 7 carbon atoms.

The following specific compounds are examples of compounds belonging to the class of compounds having the general formula given above which we have found suitable for use as stabilizing and antifogging agents:

1,2-dimethyl-3-benzylimidazolium chloride
1-ethyl-2-methyl-3-benzylimidazolium chloride
1-ethyl-2-methyl-3-benzylimidazolium bromide
1-propyl-2-methyl-3-benzylimidazolium chloride
1,2-diethyl-3-benzylimidazolium chloride
1-propyl-2-ethyl-3-benzylimidazolium chloride
1-isobutyl-2-methyl-3-benzylimidazolium chloride
1-isoamyl-2-methyl-3-benzylimidazolium chloride
1,3-dimethyl-2-heptylimidazolium iodide
1,2-dimethyl-3-heptylimidazolium iodide
1-allyl-3-heptyl-2-methylimidazolium bromide
1-benzyl-2-heptyl-3-methylimidazolium bromide
1-(2′,4′-dichlorobenzyl)-2-heptyl-3-methylimidazolium chloride
1-heptyl-2-methyl-3-benzylimidazolium chloride
1,3-dimethyl-2-nonylimidazolium iodide
1-methyl-2-nonyl-3-ethylimidazolium iodide
1-methyl-2-nonyl-3-allylimidazolium bromide
1-methyl-2-nonyl-3-benzylimidazolium bromide
1-decyl-2,3-dimethylimidazolium iodide
1-decyl-2,3-dimethylimidazolium bromide
1-decyl-2-methyl-3-ethylimidazolium bromide
1-decyl-2-methyl-3-allylimidazolium bromide
1-decyl-2-methyl-3-methallylimidazolium chloride
1-decyl-2-methyl-3-(α-thenyl)-imidazolium chloride
1-heptyl-2-methyl-3-(2′,4′-dichlorobenzyl)-imidazolium chloride
1-heptyl-2-methyl-3-(2′,4′-dichlorobenzyl)-imidazolium chloride
1-decyl-2-methyl-3-benzylimidazolium chloride
1-decyl-2-methyl-3-benzylimidazolium bromide
1-decyl-2-methyl-3-benzylimidazolium iodide
1-decyl-2-methyl-3-(4′-chlorobenzyl)-imidazolium chloride
1,3-dimethyl-2-undecylimidazolium iodide
1-methyl-2-undecyl-3-methallylimidazolium chloride
1-methyl-2-undecyl-3-benzylimidazolium bromide
1-methyl-2-undecyl-3-(4′-nitrobenzyl)-imidazolium chloride
1-amyl-2-undecyl-3-methylimidazolium iodide
1-amyl-2-undecyl-3-benzylimidazolium bromide
1-tetradecyl-2,3-dimethylimidazolium iodide
1-tetradecyl-2-methyl-3-benzylimidazolium bromide
1,3-dimethyl-2-heptylimidazolinium iodide
1-methyl-2-heptyl-3-(2′-chlorobenzyl)-imidazolinium bromide
1-heptyl-2-methyl-3-benzylimidazolinium bromide
1-benzyl-2-methyl-3-octylimidazolinium bromide
1,3-dimethyl-2-nonylimidazolinium iodide
1-methyl-2-nonyl-3-methallylimidazolinium chloride
1-methyl-2-nonyl-3-benzylimidazolinium bromide
1-decyl-2,3-dimethylimidazolinium iodide
1-decyl-2-methyl-3-benzylimidazolinium bromide
1-decyl-2-amyl-3-methylimidazolinium iodide
1-methyl-2-undecyl-3-benzylimidazolinium bromide
1-amyl-2-undecyl-3-methylimidazolinium iodide
1-amyl-2-undecyl-3-benzylimidazolinium bromide
1-amyl-2-undecyl-3-(2′-chlorobenzyl)-imidazolinium bromide
1-dodecyl-2,3-dimethylimidazolinium iodide
1-dodecyl-2-methyl-3-benzylimidazolinium bromide
1-dodecyl-2-methyl-3-(4′-chlorobenzyl)-imidazolinium chloride
1-tetradecyl-2,3-dimethylimidazolinium iodide
1-tetradecyl-2-methyl-3-methallylimidazolinium chloride These compounds are prepared by reacting a 1,2-disubstituted imidazole with an alkyl halide or a benzyl halide.

The prepartion of these compounds is described in more detail in Annalen, vol. 214, page 304; and Journal of the American Chemical Society, 1947, vol. 69, pages 2269–2270.

The antifogging agents of our invention may be added to the emulsion at any stage during its process of production. Thus, they may be added as a "ripening final," or as a "coating final." When added as a "ripening final," they are added during the ripening or sensitivity increasing stage of the emulsion making process. Such addition may be made before, during or after the addition of the soluble silver salt to the soluble halide in the presence of a suitable colloid, such as gelatin, polyviny alcohol, solubilized casein or albumin. When added as a "coating final," the antifogging agent of our invention is added to the emulsion just prior to coating it on a suitable support such as glass, paper, or film at a time when the emulsion has nearly attained its maximum sensitivity.

In some instances, it is advantageous to employ the antifogging and stabilizing compounds of our invention in a separate layer such as an undercoating layer or in an anti-abrasion gelatin surface. Sometimes it is desirable to incorporate the compounds in one or all processing baths such as the developer solution or in the pre- and post-baths.

When used as a "ripening final," the antifoggants of our invention are preferably added to the emulsion in an amount ranging from 0.1 milligram to 50 milligrams per 0.6 mol of silver halide and when used as a "coating final," they are preferably added in an amount ranging from 10 milligrams to 150 milligrams per 0.6 mol of silver halide. The optimum amount to be added depends primarily on the type of emulsion and should be determined individually in each case.

The stabilizers and antifoggants of our invention may also be used in combination with known antifoggants and stabilizers. The antifoggants of our invention can also be used in combination with sensitizers such as sulfur, metal and reduction sensitizers as well as with speed-increasing agents and accelerators such as the reaction products of long-chain alcohols and ethylene oxide (see U.S. Patent 1,970,578) and their derivatives and polyvinyl-pyrrolidone.

The novel antifoggants of our invention may be used with various types of photographic emulsions, such as non-sensitized, orthochromatic, panchromatic and X-ray emulsions, paper emulsons and color emulsions.

The following specific examples are given as an illustration of the manner in which the antifoggants of our invention can be used. It is to be understood, however, that these examples are given by way of illustration and not by way of limitation.

*Example I*

A silver halide emulsion in gelatin containing 2 percent silver iodide and 98 percent silver bromide was prepared in a conventional manner and brought up to its maximum light sensitivity. It was then readied for coating, finals were added such as sensitizing dyes and hardening agents. A 0.1 percent solution of 1,2-dimethyl-3-benzylimidazolium chloride was added in varying amounts to samples of the emulsion as an antifoggant and stabilizer. Each emulsion sample contained about 0.6 mol of silver halide. The so prepared emulsion samples were coated on a suitable cellulose ester base and dried. Samples of these film coatings were then exposed in a Type IIB Sensitometer and developed in a developer of the following composition:

| | Grams |
|---|---|
| Metol (p-methylaminophenol sulfate) | 1.5 |
| Sodium sulfite (anhydrous) | 45 |
| Sodium bisulfite | 1 |
| Hydroquinone | 6 |
| Sodium carbonate (monohydrated) | .8 |
| Water to make 1 liter. | |

The developed samples were short-stopped, fixed, washed and dried. The results obtained were as follows:

| Quantity of Compound Used | Relative Speed | Fog at 12 Minute Development | Oven Fog at 6 Minute Development |
|---|---|---|---|
| 0 | 100 | .32 | .26 |
| 10 mg | 100 | .26 | .20 |
| 20 mg | 100 | .24 | .17 |
| 50 mg | 100 | .20 | .15 |
| 80 mg | 75 | .20 | .12 |

The 1,2-dimethyl-3-benzylimidazolium chloride was prepared as follows:

Two and four-tenths grams of 1,2-dimethylimidazole and 3.2 grams of benzyl chloride were placed in a sealed tube and heated for two hours at 100° C. The solid was taken up in 100 ml. of boiling ethyl acetate and 1.5 ml. of absolute ethanol. After chilling, the solid was collected and a second crystallization yielded 3.2 grams of white crystals, M.P. 191–2° C.

*Example II*

The procedure followed was identical to Example I, except that in place of 1,2-dimethyl-3-benzylimidazolium chloride the compound used was 1-heptyl-2-methyl-3-benzylimidazolium chloride prepared according to the method described in J.A.C.S., vol. 69, page 2270.

The results obtained were very similar to those described in Example I.

*Example III*

The procedure followed was identical to Example I, but in place of 1,2-dimethyl-3-benzylimidazolium chloride, the compound used was 1-decyl-2,3-dimethylimidazolium iodide which had been prepared according to the method described in J.A.C.S., vol. 69, page 2270.

The results obtained were essentially identical with those described in Example I.

*Example IV*

Exposed samples of a photographic film were developed for twelve minutes at 65° F. in a standard metol-hydroquinone developer. Two tests were made, one with the standard developing solution and one with the same developer, but containing in addition 10 mgs. of 1,2-dimethyl-3-benzylimidazolium chloride per one liter of developer.

Sensitometric strips, developed in the normal developer (control) for twelve minutes, showed a fog of .30, whereas those strips, which were developed in the developer containing the anti-foggant, had a fog of .20.

*Example V*

A silver halide emulsion in gelatin containing 2 percent silver iodide and 98 percent silver bromide was coated on film base in a manner known to the art. After the coating was performed, an aqueous gelatin solution containing 20 grams of gelatin per 1 liter and 20 mg. of 1,2-dimethyl-3-benzylimidazolium chloride was coated thereon as an anti-abrasion layer. After drying, the film samples were exposed and processed as described in Example I. The samples exhibited a relative speed of 100 and a fog of .20 while a type coating of the above emulsion covered with an antiabrasion layer similar to that described above, but lacking the antifoggant had a speed of 100 and a fog of .30.

Our invention is not limited to the detailed description contained herein, but includes all modifications that fall within the scope of the appended claims.

We claim:

1. A light-sensitive silver halide emulsion containing an antifogging and stabilizing compound of the following general formula:

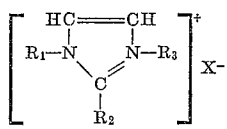

wherein $R_1$ is a substituent selected from the group consisting of lower alkyl, allyl, methallyl and thenyl; $R_2$ and $R_3$ are each a substituent selected from the group consisting of alkyl and benzyl, at least one of said substituents $R_2$ and $R_3$ containing at least 7 carbon atoms; and X represents a halide selected from the group consisting of chloride, bromide and iodide.

2. A light-sensitive silver halide emulsion as recited in claim 1, wherein the antifogging and stabilizing compound is 1,3-dimethyl-3-benzylimidazolium chloride.

3. A light-sensitive silver halide emulsion as recited in claim 1, wherein the antifogging and stabilizing compound is 1-decyl-2,3-dimethylimidazolium iodide.

4. A light-sensitive halide emulsion as recited in claim 1, wherein the antifogging and stabilizing compound is 1-heptyl-2-methyl-3-benzylimidazolium chloride.

5. A light-sensitive silver halide emulsion as recited in claim 1, wherein the antifogging and stabilizing compound is present in the emulsion in the ratio of 0.1 to 150 milligrams per 0.6 mol of silver halide.

6. A light-sensitive silver halide emulsion as recited in claim 1, wherein the antifogging and stabilizing compound is present in the emulsion in the ratio of 0.1 to 50 milligrams per 0.6 mol of silver halide.

7. A light-sensitive silver halide emulsion as recited in claim 1, wherein the antifogging and stabilizing compound is present in the emulsion in the ratio of 10 to 150 milligrams per 0.6 mol of silver halide.

8. A light-sensitive silver halide emulsion as recited in claim 1, containing an optical sensitizer.

9. A light-sensitive silver halide emulsion as recited in claim 1, containing the reaction product of a long chain alcohol and ethylene oxide as an accelerator.

10. A light-sensitive photographic material comprising a base and a light-sensitive silver halide emulsion thereon, said emulsion containing as an antifogging and stabilizing agent a compound of the following formula:

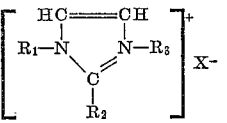

wherein $R_1$ is a substituent selected from the group consisting of lower alkyl, allyl, methallyl and thenyl; $R_2$ and $R_3$ are each a substituent selected from the group consisting of alkyl and benzyl, at least one of said substituents $R_2$ and $R_3$ containing at least 7 carbon atoms; and X represents a halide selected from the group consisting of chloride, bromide and iodide.

11. A light-sensitive material as recited in claim 10 wherein said antifogging agent is 1,3-dimethyl-3-benzyl-imidazolium chloride.

12. A light-sensitive material as recited in claim 10 wherein said antifogging agent is 1-decyl-2,3-dimethyl-imidazolium iodide.

13. A light-sensitive material as recited in claim 10 wherein said antifogging agent is 1-heptyl-2-methyl-3-benzyl-imidazolium chloride.

14. A light-sensitive material comprising a base, a layer of light-sensitive silver halide emulsion thereon, and a separate layer adjacent said first mentioned layer containing as an antifogging and stabilizing agent, a compound of the following general formula:

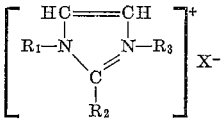

wherein $R_1$ is a substituent selected from the group consisting of lower alkyl, allyl, methallyl and thenyl; $R_2$ and $R_3$ are each a substituent selected from the group consisting of alkyl and benzyl, at least one of said substituents $R_2$ and $R_3$ containing at least 7 carbon atoms; and X represents a halide selected from the group consisting of chloride, bromide and iodide.

15. A light-sensitive material as recited in claim 14 wherein said antifogging agent is 1,3-dimethyl-3-benzyl-imidazolium chloride.

16. A light-sensitive material as recited in claim 14 wherein said antifogging agent is 1-decyl-2,3-dimethylimidazolium iodide.

17. A light-sensitive material as recited in claim 14 wherein said antifogging agent is 1-heptyl-2-methyl-3-benzyl-imidazolium chloride.

18. The process of minimizing and preventing fog in light-sensitive silver halide materials comprising a base having a light-sensitive silver halide emulsion thereon, which comprises exposing the emulsion to light and developing the same in the presence of an antifogging amount of an antifoggant of the following general formula:

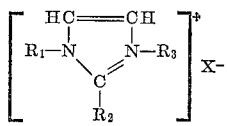

wherein $R_1$ is a substituent selected from the group consisting of lower alkyl, allyl, methallyl and thenyl; $R_2$ and $R_3$ are each a substituent selected from the group consisting of alkyl and benzyl, at least one of said substituents $R_2$ and $R_3$ containing at least 7 carbon atoms; and X represents a halide selected from the group consisting of chloride, bromide and iodide.

19. The process as defined in claim 7 wherein said antifoggant is 1,2-dimethyl-3-benzylimidazolium chloride.

20. The process as defined in claim 7 wherein said antifoggant is 1-decyl-2,3-dimethylimidazolium iodide.

References Cited in the file of this patent

UNITED STATES PATENTS

| 2,232,707 | Kendall | Feb. 25, 1941 |
| 2,860,982 | Jones | Nov. 18, 1958 |

FOREIGN PATENTS

| 271,475 | Great Britain | Nov. 10, 1927 |
| 390,037 | Great Britain | Mar. 30, 1933 |